(12) United States Patent
Schick et al.

(10) Patent No.: US 8,132,538 B1
(45) Date of Patent: Mar. 13, 2012

(54) SYSTEM AND METHOD FOR GESTATION OF SOWS IN LARGE PEN GESTATION FACILITIES

(76) Inventors: Paul H. Schick, Kutztown, PA (US);
Joseph Schick, Kutztown, PA (US)

( * ) Notice: Subject to any disclaimer, the term of this patent is extended or adjusted under 35 U.S.C. 154(b) by 1105 days.

(21) Appl. No.: 11/760,693

(22) Filed: Jun. 8, 2007

Related U.S. Application Data

(60) Provisional application No. 60/812,157, filed on Jun. 8, 2006.

(51) Int. Cl.
*A01K 1/00* (2006.01)
*A01K 3/00* (2006.01)
(52) U.S. Cl. .......................................... 119/502
(58) Field of Classification Search ............... 119/14.03, 119/444, 502, 503, 515, 436, 840
See application file for complete search history.

(56) References Cited

U.S. PATENT DOCUMENTS

| | | |
|---|---|---|
| 1,309,071 A | 7/1919 | Johnson |
| 1,590,982 A | 6/1926 | Morris |
| 1,788,244 A | 1/1931 | Larson |
| 1,858,699 A | 5/1932 | Bayley |
| 3,042,000 A | 7/1962 | McMurray et al. |
| 3,137,270 A | 6/1964 | Rigterink et al. |
| 3,148,663 A | 9/1964 | Conover |
| 3,191,578 A | 6/1965 | Magruder |
| 3,216,396 A | 11/1965 | Scamman |
| 3,584,603 A | 6/1971 | Rutherford |
| 3,749,060 A | 7/1973 | Wagner |
| 3,788,276 A | 1/1974 | Propst et al. |
| 3,994,548 A | 11/1976 | Lindvall et al. |
| 4,027,628 A | 6/1977 | Butler et al. |
| 4,288,856 A | 9/1981 | Linseth |
| 4,359,967 A | 11/1982 | Cornelson |
| 4,471,719 A | 9/1984 | Thomson |
| 4,517,923 A | 5/1985 | Palmer |
| 4,617,876 A | 10/1986 | Hayes |
| 4,712,511 A | 12/1987 | Zamzow et al. |
| 5,069,165 A | 12/1991 | Rousseau |
| 5,099,793 A | 3/1992 | Sievers |
| 5,241,924 A | 9/1993 | Lundin et al. |
| 5,309,864 A | 5/1994 | Harmsen et al. |
| 5,482,008 A * | 1/1996 | Stafford et al. ............... 119/174 |
| 5,579,719 A | 12/1996 | Hoff et al. |
| 5,595,144 A * | 1/1997 | Loher ............................ 119/840 |
| 6,000,361 A | 12/1999 | Pratt |
| 6,341,582 B1 * | 1/2002 | Gompper et al. ............. 119/840 |
| 6,382,135 B1 | 5/2002 | Van Grootheest et al. |
| 6,539,896 B1 | 4/2003 | Larsen |
| 6,805,078 B2 | 10/2004 | Zimmerman et al. |
| 6,899,044 B2 | 5/2005 | Thibault et al. |
| 7,073,459 B2 | 7/2006 | Larsen |
| 2003/0094144 A1 * | 5/2003 | Schick ........................... 119/840 |
| 2007/0131175 A1 * | 6/2007 | Pratt .............................. 119/720 |

* cited by examiner

*Primary Examiner* — Monica Williams
(74) *Attorney, Agent, or Firm* — Charles A. Wilkinson; Clinton H. Wilkinson

(57) ABSTRACT

A sow management system makes use of separate Trickle Feeding and loafing areas separated by a one way gate or gates to establish a general continuous flow of sows through an interrogator apparatus where an RFID tag for each sow is read to determine if such sow should be returned to the general Trickle Feeding area or at least two other possible areas through automatic gating controlled by computer means sensitive to RFID tagging of the sows.

24 Claims, 9 Drawing Sheets

Fig. 8
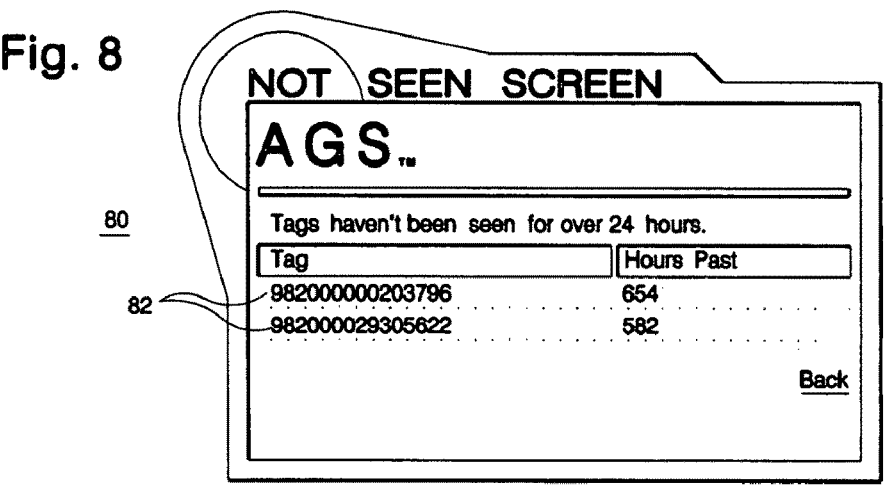
Fig. 9
Fig. 10
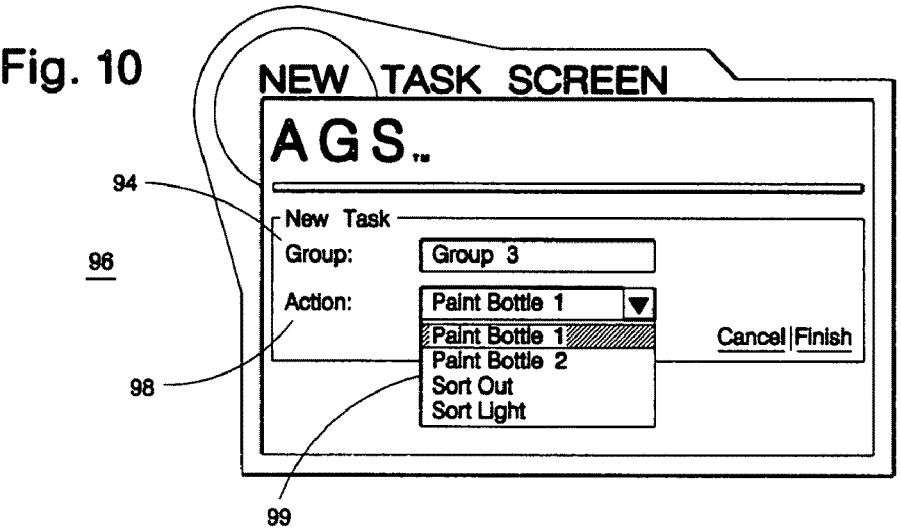

SYSTEM AND METHOD FOR GESTATION OF SOWS IN LARGE PEN GESTATION FACILITIES

CROSS-REFERENCE TO PREVIOUS RELATED APPLICATION

This application for patent claims priority from U.S. Provisional Patent Application No. 60/812,157, filed Jun. 8, 2006 under the title "System and Method for Individualized access to Sows Living in Large Pen Gestation Facilities."

BACKGROUND OF THE INVENTION

1. Field of the Invention

The present invention relates to growing and living facilities for hogs, and more particularly to farrowing operations and equipment including the use of large pen gestation facilities for sows, and more particularly still to a system for improving the welfare and performance of gestating sows in a large pen environment and for improving the grower's accessibility to the sows for managing purposes.

2. Preliminary Discussion

A critical aspect of pork or swine production is the continual provision and supply of new piglets, or farrows, for growing. Management of pregnant or gestating sows is thus critical, and keeping the sows comfortable and healthy will improve the likelihood that healthy farrows will be born and also increase the overall successful gestation rate. Gestation facilities are used to house sows that are both not yet pregnant or are pregnant but have not come to term. The primary goal of a gestation facility is to provide sows with a living environment that is comfortable and accessible. Accessibility applies to both the sow and the grower. The sows require access to food and water, while the grower requires access to the individual sows.

In early farming, many or most farmers would maintain one or two hogs or pigs in the farm pigpen where they grew to the desired size and were then slaughtered for personal or home consumption, or if more pigs were maintained than required for personal or family consumption, some would be sold for slaughter and for consumption by other farmers, or shipped off for ultimate consumption by city dwellers. Later, some farmers began to specialize in hog growing or relatively large-scale hog production. In these operations there tended to be specialization between fattening hogs for market or raising breeding sows for sale to the fattening operators or operations known generally as "finishing" the hogs for market. Since some of the female pigs, or sows, were not slaughtered until their breeding days were over, special care was taken in their raising and care and in more recent or relatively recent times the sows were maintained separately in fields provided with individual houses or covered pens for shelter of both the sows, and when their piglets were born, also the newborn piglets and young pigs, both male and female, both of which would then be sent to so-called finishing operations for fattening or raising to suitable size for market. Special female pigs, or sows, and a very few special male pigs or boars, would be reserved for breeding as needed.

As time passed, it was discovered that the mixing of different sows as well as their young pigs in the fields not only took too much acreage, as land became more expensive and also tended to spread disease between the sows and between their young after birth and gradually farrowing operations, which includes generally the breeding or insemination of sows, gestating the sows for approximately 100 to 110 days and then birthing of the sows to produce piglets, began to be conducted under cover with each sow kept in her own relatively small pen close to, but physically isolated from other sows in the same farrowing operation. This also had the advantage of having the location of any given sow at any given moment predetermined so that by keeping track of the breeding of each sow, usually by artificial insemination, it would be known when such sow would be ready for birthing and, if special birthing rooms or pens were being used, the particular sow could be moved to such birthing room or pen and give birth there where special attention to the newborn piglets could be given. Alternatively, the sow could simply be left in her pen for birthing, providing special arrangements to prevent harm to the piglets after birth by being crushed to death beneath their outsized mothers. Since the sows were continuously confined in their own pen, special attention for monitoring their pregnancy, the giving of medicine, and tests to make sure they were actually gestating and hadn't accidentally aborted or failed to conceive could be easily given to each sow in turn or according to a predetermined schedule. A number of inventions with respect to special stalls or pens and other equipment for this type of operation were made and patented during this period and continue to be developed and patented.

Relatively recently, certain disadvantages with the pen system of farrowing have come to the fore including lack of comfort of the sows, the amount of labor involved in keeping track of the animals and conveniently accessing such sows in their long rows of individual pens, agitation of the animals simply from the frustration of the animals at being closely penned, leading to wild and unpredictable behavior, and the like. Being continuously confined, furthermore, results in a build-up of tension in the sows with consequent decrease in their health and the health and size of their litters, probably because of unleashed long-term tensions, which are evidenced by excitability and restlessness. Agitation of all the sows during feeding, each animal wanting to be fed first, and general agitation whenever an attendant entered the building plus general confinement stress was perceived gradually to be, in fact, detrimental to the health of the sows as well as the young being gestated and in addition, animal rights activists also began to take up the case of the animals and regulations began to be promulgated requiring minimum amounts of space for each animal.

Pigs or hogs are generally social animals which in the wild tend to travel in groups from one feeding area to another maintaining relatively close contact with other animals in the same groups both for support and for better location of productive feeding areas. Isolating hogs in individual pens deprives them of close contact with other animals and makes them generally nervous and unpredictable and as noted above, is believed to be detrimental to the general health and birth weight of young newborn piglets.

As a result of the foregoing disadvantages of individual penning of sows during gestation so-called "open pen" gestating facilities or arrangements have been adopted by some growers, in which, after breeding or artificial insemination of the sows, such sows are, after preliminary artificial insemination, which takes place usually in individual pens, where such sows may then be kept for a period such as twenty-eight days to make sure that the individual embryos have become securely attached to the wall of the sow's womb, released into an open style gestating pen similar to open pen pig finishing operations, although a sow may be released immediately, or after a few days, if the farrowing operation is short of impregnation pens. Since it takes a finite time after actual impregnation for an embryo to become securely attached to a sow's womb, poking of such sow's belly by other sows or pigs may sometimes result in an aborted fetus. This, however, become less likely as the end of a 28 day implantation period approaches. The sows in this type of operation are released into a large pen, allowing the animals to have essentially full social contact with other similar animals. While this has been provided in some cases, and it is believed, results in more healthy young piglets, it has had two major drawbacks, namely fighting and difficult, or even complete, lack of access to the animals by the growers.

Farrowing operations are inherently somewhat individualized operations in which each sow may require individualized attention due to special needs such as special food for some sows, medical care for others, individualized removal for various reasons including particularly the time approaching for birth, possible injury from other animals and the like. It is particularly desirable to remove the animals at least once and possibly several times to test for continued pregnancy, else a non-pregnant sow may spend many days in a sow gestation operation eating special food, and ultimately be found when it is time for birthing not to even be pregnant. (More recently ultrasonic pen testing has been available in large operations.) These animals may be about four to five hundred pounds in weight and are extremely difficult to cull or sort out of a group of similar animals, since the individual animals have "minds of their own", plus as might be suspected, are inherently suspicious of being herded, so to speak, in a contrary direction from their pen mates or other sows in a pen. While the individual animals are, therefore, not inherently dangerous under most circumstances, it will frequently take several grown men to sort or cull them out of a multi-animal or so-called open pen, one man to guard and open and close the gate to keep other animals from escaping and two to urge the sow toward the gate while discouraging movement of her pen mates in the same direction. Such culling or separation is obviously time consuming and expensive in operation time.

The other major problem in open pen environments is fighting at feeding time when sows tend to "hog" all the food, a characteristic of the animals as shown by the growth of the universality of the slang term. A further problem in open pen environments is non-feeding fights which usually results from certain sows taking a dislike to other sows for whatever reason. Again, because hogs are social animals, individual fighting is not continuous, but rather sporadic as animals take specific dislikes to each other or some particular pen mate. Where there are more than a few animals in one pen, there may be one sow, which, for some reason not usually evident to the managers of the pen is unpopular with other certain sows or which some other sows just do not like and if some way to allow actual separation of these animals from the others which do not like them is not available, the objected to individual sows may be actually killed. Frequently these individualized battles can be resolved simply by having a large enough pen to allow the picked upon sow to get away by herself or away from her attackers or potential attackers, but otherwise such sow must be removed from the pen on a high priority basis and to do this she must be culled out or removed to an individual pen usually on an expedited basis.

3. Description of Related Art

The following patents of which the present inventors are aware provide among other things a general history of the development of farrowing operations from earlier portions of this century to the present.

U.S. Pat. No. 1,309,071 issued Jul. 8, 1919 to F. G. Johnson provides a heated farrowing house having hollow air insulated walls with several pens disposed within and with a central section in each pen partitioned off by a suspended circular barrier in which small pigs are kept, the size in general making it most convenient for a brood sow to lie with her nipples extended centrally where the small piglets are maintained. While this arrangement provides more room for individual sows than the usual pens and is intended to keep the piglets safe from being lain upon, there do not appear to be multiple sows in one pen, so separate management of gestating sows is not necessary.

U.S. Pat. No. 1,590,982 issued Jun. 39, 1926 to E. B. Morris discloses a heated farrowing house having a half dozen separate pens within a hexagonal structure.

U.S. Pat. No. 1,765,925 issued Jun. 24, 1930 to W. Lodize discloses an advanced design for the usual multiple pen farrowing houses having an improved arrangement for working, but still comprising essentially a separate pen for each sow.

U.S. Pat. No. 1,788,244 issued Jan. 6, 1931 to J. E. Larson discloses an animal house for small pigs having a common central feeding bin from which all the pigs may eat with coil spring means to especially keep larger animal confined in limited individual areas of the building.

U.S. Pat. No. 1,858,699 issued May 17, 1932 to W. D. Bayley for a farrowing house specifically including a heated "housing" space or enclosure to which small piglets may retire to, but which is separated from enclosures for sows. Individual hog pens are adapted to be moved against the separate heated housing space enclosure in cold weather. While allowing piglets access to the central heated housing space, the sows are still apparently restricted to the separate farrowing houses, however, but receive heat transferred from the heated central building.

U.S. Pat. No. 3,042,000 issued Jul. 3, 1962 to P. H. McMurray et al. discloses a farrowing equipment arrangement including a separate pen for each sow in which farrowing takes place and the piglets are weaned. The floor includes a series of close together strips or boards standing on edge which allows pig waste to drop down and be conveyed away by conveyor means below. A central conveyor screw or conveyor is provided between individual pens for the sows to bring feed to the sows. In addition, separate smaller pen enclosures are provided at the sides of the larger pen enclosures for the accommodation of piglets in areas near the sows, but in which the sows will not fit, thus tending to protect the piglets from accidental crushing and provide them with more room for movement.

U.S. Pat. No. 3,137,270 issued Jun. 16, 1964 to P. D. Rigterwik et al. discloses a sanitary slotted floor for hog facilities including drainage and cooling arrangements. Such floor is now apparently commonly used in all major hog buildings.

U.S. Pat. No. 3,148,663 issued Sep. 15, 1964 to W. J. Conover discloses a circular farrowing building incorporating essentially truncated triangle-shaped adjoining individual stalls or sow pens. The arrangement enables a central feeding system to be conveniently used.

U.S. Pat. No. 3,191,578 issued Jun. 29, 1965 to G. H. Magruder discloses an irregular combined farrowing and finishing unit for hogs. The sows are still maintained separate from each other so that their limited location allows them to be easily accessed.

U.S. Pat. No. 3,216,396 issued Nov. 9, 1965 to W. H. Scamman discloses a pig farrowing house in which the sows are limited to movement within a restricted space by a barrier-type gate positioned a distance away from the floor to allow pigs through, but to restrict movement of the sows. Opposite the barrier is a broader section large enough for piglets and small pigs, but not large enough for a full-grown sow, and therefore, not subject to occupation by a sow.

U.S. Pat. No. 3,416,496 issued Dec. 17, 1968 to D. L. Peterson discloses a restricted space farrowing house, which prevents major movement by sows in order to protect small pigs from injury.

U.S. Pat. No. 3,584,603 issued Jun. 15, 1971 to D. C. Rutherford discloses a farrowing house arrangement in which sows are restricted to individual stalls or pens, but providing a specially constructed floor which is claimed to remain dry and sanitary more easily. It is disclosed by Rutherford that until fairly recently sows were customarily bred in a small farrowing house in an open field. In such arrangement the sows were free to roam around the open field and mingle with other sows and their respective young piglets. However, more recently pork producers have found that if the sows and piglets are confined to a building which is properly sanitized there is less disease and if such buildings are properly engineered, fewer piglets are accidentally killed by the sows.

U.S. Pat. No. 3,225,737 issued Dec. 28, 1965 to H. Bicket discloses a pig rearing house or piggeric having closely confining pens arranged to maintain as much as possible the temperature near sow body heat temperatures and to require the minimum necessary movement together with good oxygen circulation plus automatic sanitation.

U.S. Pat. No. 3,726,254 issued Apr. 10, 1973 to W. J. Conover discloses a multistory farrowing structure arranged to recover food not eaten by younger animals on higher levels and feed it to pregnant sows on lower floors with the interesting result that the pregnant sows are automatically inoculated with certain disease organisms affecting young pigs and, it is claimed, build up antibodies against such disease or diseases which antibodies are transformed to their subsequently born young.

U.S. Pat. No. 3,749,060 issued Jul. 31, 1973 to J. Wagner discloses a circular pen arrangement for broad sows and piglets in which either the individualized pens rotate within food supplies and waste disposed facilities on a daily controlled scheduled or alternatively the food and waste facility equipment moves past the individual stalls.

U.S. Pat. No. 3,994,548 issued Nov. 30, 1976 to R. N. Lindvall et al. discloses an early sow monitoring system to keep track of individual sows by the use of individualized cards coded with ear numbers for sows and placed in a rotatable carousel which advances one compartment a day to keep track of what sow must be handled on what day. It is indicated that the health of sows is increased if they are kept in a farrowing crate during the farrowing period and the mechanical apparatus of the invention facilitates this type of record keeping.

U.S. Pat. No. 4,027,628 issued Jun. 7, 1977 to R. M. Butler et al. discloses a mechanically operable feeding network particularly to control the feeding of sows during gestation. The apparatus is particularly useful for regulating the access of sows to feed on a regular basis.

U.S. Pat. No. 4,227,485 issued Oct. 14, 1980 to D. I. Poore discloses an individualized farrowing house.

U.S. Pat. No. 4,269,146 issued May 26, 1981 to C. L. Linderman provides a further specialized or individualized hog farrowing house.

U.S. Pat. No. 4,359,967 issued Nov. 23, 1982 to S. L. Cornelson discloses a cast concrete farrowing house made in an "A" frame form.

U.S. Pat. No. 4,471,719 issued Sep. 18, 1984 to C. Thompson discloses a sow farrowing stall constructed and having a shape preventing a sow from lying on her piglets.

U.S. Pat. No. 5,099,793 issued Mar. 31, 1992 provides yet another individualized farrowing shed.

U.S. Pat. No. 6,382,135 issued May 7, 2002 to E. V. Groothust et al discloses yet another arrangement for individual pigpens with restraining rails to keep birthing sows from lying on their piglets.

In addition to the above noted sampling of some of the earlier prior art, the present inventors are aware of the following prior art references which have taken the food animal husbandry industry and the farrowing industry into the computer age and may in some cases seem to have some bearing upon the present applicants' invention.

U.S. Pat. No. 3,788,276 issued Jan. 29, 1974 to R. I. Propst et al., entitled "Animal Marking Apparatus and Method," provides a method and means for tagging livestock animals and keeping track of such animals by means of tag reading means.

U.S. Pat. No. 4,288,856 issued Sep. 8, 1981 to G. S. Linsith, entitled "Livestock Feedlot Management Method and Apparatus," discloses an early use of a programmable microprocessor and progressive weighing of animals passing through the scales to keep track of and sort animals having different weight gains and losses.

U.S. Pat. No. 4,517,923 issued May 21, 1985 to T. Palmer, entitled "Animal Feeding System," discloses another electronic animal monitoring system, which not only monitors animals electronically but adjusts the feed of the animals accordingly. It is disclosed that various other information in addition to weight may be included in the computer monitoring system including breeding information such as coming into heat dates, times bred dates, calving dates, estimated due dates and the like information useful in the management of a dairy herd may be collected. The feed provided by individualized feed stations may be controlled.

U.S. Pat. No. 4,617,876 issued Oct. 21, 1986 to N. J. Hayes, entitled "Animal Identification and Control System," discloses using electronic identification tags and particularly ear tags to admit livestock to special feeding stalls where specialized feeding for specific livestock may be applied and other information obtained by a scale in the feed stall. Various other information may be kept track of including the last time a given animal ate. Different visual numbers may be used for the identification of the animals from electronically used unique code number for each animal.

U.S. Pat. No. 4,712,511 issued Dec. 15, 1987 to D. D. Zanzow et al., discloses a fairly sophisticated computer management control system for livestock including specific food mixes for specific animals based on information obtained concerning the specifically identified animal.

U.S. Pat. No. 5,069,165 issued Dec. 3, 1991 to V. Rousseau, entitled "Livestock Feeder System," uses auger systems for feeding animals based upon individual computer controlled data identifying an animal electronically.

U.S. Pat. No. 5,241,924 issued Sep. 7, 1993 to S. Lundin provides an electronic system to manage cows in individual feed stations.

U.S. Pat. No. 5,309,864 issued May 10, 1994 to J. Harmsen, entitled "Method and Apparatus for Feeding Animals," discloses an animal feeding arrangement for feeding animals and particularly sows in individual farrowing feed pens. An electronic identification system is used to identify individual sows when they enter individual feed pens. The animals can be fed individually based upon the information provided by their transponder. Harmsen explains the advantages of open pen housing of pigs and indicates fighting can be alleviated by feeding all the animals at the same time.

U.S. Pat. No. 6,000,361 issued Oct. 14, 1999 to W. C. Pratt is a classic electronic identification patent making use of electronic identification tags for livestock to sort such livestock according to weight and other factors.

U.S. Pat. No. 6,539,896 issued Apr. 1, 2003 to J. K. Larson discloses a carousel type feeding arrangement making use of electronic transponders with unique codes for different animals to control specific feeding schedules. The system is particularly applicable to use for so-called cattle. It is disclosed that it may be applied, however, to sows. It is specifically disclosed that the transponder can be used for separation of a sow for insemination or farrowing or the like. A carousel feeder is used because it is said to conserve space.

U.S. Pat. No. 5,579,719 issued Dec. 3, 1996 to S. J. H of et al., entitled "Method and Means for Quasi Ad-Libitum Feeding for Gestation of Sows in Loose Housing," discloses a sow feeding system providing an apparent free range or open pen arrangement having a feed pen within it capable of feeding a series of sows at one time with electronic control of the amount each sow is provided.

U.S. Pat. No. 6,805,078 issued Oct. 19, 2004 to R. C. Zimmerman, entitled "Livestock Weighing and Sorting Apparatus," discloses a sorter and gate arrangement for sorting out by weight a series of pigs while keeping track of them by computer means. It is disclosed that after hogs have passed through the apparatus during a given time period they become very calm in traversing the apparatus.

U.S. Pat. No. 6,899,044 issued May 31, 2005 to R. M. Thegault et al., entitled "Swinging Gate Assembly Electronic Livestock Feeding Station and Automatic Sorter System," discloses a particular gate construction for use with electronic sorting systems for sows.

U.S. Pat. No. 7,073,459 issued Jul. 11, 2006 to J. K. Larson is a continuation-in-part of Larson's earlier patent to a carousel-type electronic feeding system applicable to sows.

So-called slow feed systems, such as "Trickle Feeding" systems sold by Automated Production Systems of Assumption, Ill. are feeding systems used for various animals and birds which conveys feed pellets or the like usually by auger means to a reservoir which holds whatever amount is conveyed to it, and then releases such feed pellets through an opening which allows only enough food to drop from the reservoir onto a feeding surface as one animal can eat at a time, or in some cases at a rate equal to the slowest eater in the group.

While the earlier prior art systems and facilities for housing sows during farrowing discussed above are useful for their own particular indicated purposes, and the earlier ones mainly are for historical purposes in tracking the development of the art of farrowing, none gives swine producers sow-level access to individual sows in a large pen sow gestation facility. The present inventors' system for automating the flow of sows in gestation facilities to improve individualized access to sows, however, fully meets the needs of both the sow and the grower in a large-pen design by creating a well-defined flow in the facility and providing equipment to perform sow-level tasks and alter flow as needed. Individual sows are easily kept track of and are able to be individually managed for a variety of purposes while still maintaining a communal living system. When combined with a so-called trickle feeding system moreover a much more peaceful and tractable large pen gestation facility and operation is obtained which is both easier, more healthful, and efficient to operate than previous farrowing arrangements.

OBJECTS OF THE INVENTION

It is therefore a primary object of the invention to provide a system and method for managing sows in open pen gestation facilities.

It is a further object of the invention to provide a system and method for giving swine producers sow-level access to individual sows in large pen gestation facilities, whereby a natural flow of sows from food to water and vise versa is created and the sows must pass through interrogation equipment as part of such natural flow, and upon passing through such interrogation equipment the sows can be identified and marked for further attention or procedures or the natural flow of sows can be altered to allow tasks on individual sows to be performed as needed.

It is a still further object of the present invention to provide a system and method for identifying individual sows or groups of sows in a large pen gestation facility on which sows tasks such as vaccination, pregnancy testing are to be performed, as well as for culling a sow or groups of swine from the population.

It is a still further object of the invention to provide a system and method for automatically identifying sows that it has been determined require a special diet or rations from that being fed to the main population of sows in a large pen environment where a mass feeding system such as Trickle Feeding is being utilized, and directing them into a separate feeding area.

It is a still further object to provide a large group pen environment for sows wherein an individual sow identification system such as RFID technology is used to identify and manage individual sows and groups of sows within the larger group.

It is a still further object of the invention to provide a system and method to provide a simple, economical system for managing sows in a farrowing gestation operation which effectively reduces conflict between sows thereby reducing stress and tension in the sows and producing, as a result healthier young while at the same time, providing superior access to the sows in order to effectively attend to special needs of particular sows.

It is a still further object of the invention to provide a combination system and method for management of a sow gestating system which is not only suitable for relatively small sow gestating operations, but can be simply expanded into a larger scale system handling large quantities of sows in a farrowing operation.

Still other objects and advantages of the invention will become clear upon review of the following detailed description in conjunction with the appended drawings.

SUMMARY OF THE INVENTION

The present invention is directed to a sow management system and method for managing or controlling sows during their gestating period to actual birthing by establishing a regular flow of sows in an open or large pen gestating facility from a restricted feed flow section of a sow building to a separate loafing section and back through an interrogator apparatus where RFID tags or an equivalent identification system is able to identify and mark or separate out previously identified sows and direct them depending upon previous identification back to the restricted feed flow section, a separate restricted feed flow section where feed of a different quality or quantity is provided, or alternatively to at least one other area such as an alley where the sows so separated can be directed to other areas such as a birthing area as appropriate. The system of the invention includes a so-called slow feeding system as an integral portion of the entire sow management system in order to minimize conflict of the sows within the group and thereby increase the level of health of both the sows and their newborn piglets.

BRIEF DESCRIPTION OF THE DRAWINGS

FIG. 8 illustrates a sample screen showing undetected RFID tags for the application software program used with the present invention.

FIG. 9 illustrates a sample "new group" screen for the application software program used with the present invention.

FIG. 10 illustrates a sample "new tasks" screen for the application software program used with the present invention.

DESCRIPTION OF THE PREFERRED EMBODIMENTS

Figure 1:
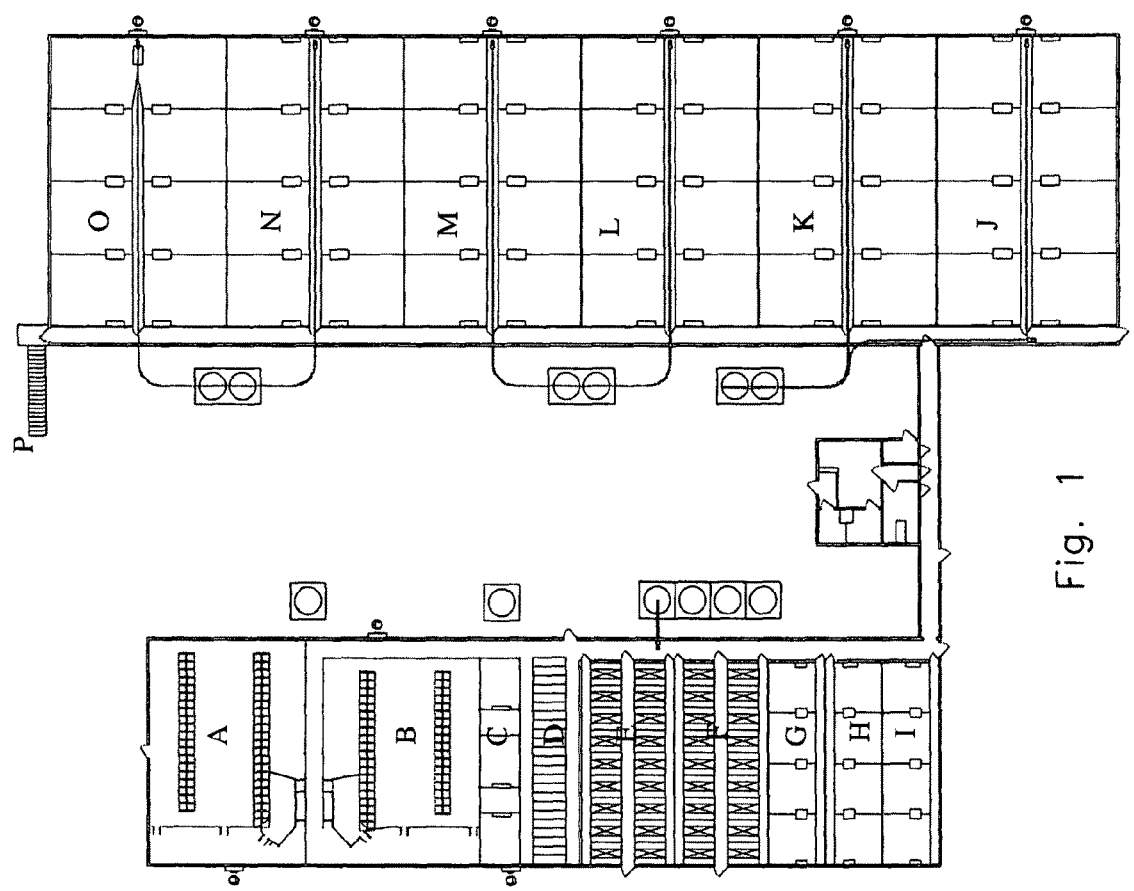
FIG. 1 is a plan view or layout of a typical hog production facility including an initial farrowing operation including the open pen concept and improvements of the present invention plus a conventional finishing operation in which the young pigs from the farrowing operation are grown to market size.

The following detailed description is of the best mode or modes of the invention presently contemplated. Such description is not intended to be understood in a limiting sense, but to be an example of the invention presented solely for illustration thereof, and by reference to which in connection with the following description and the accompanying drawings one skilled in the art may be advised of the advantages and construction of the invention.

As explained above, it had been the practice for many years for most gestating sows to be housed in individual stalls during the 100-120 (usually about 114 days) day gestation period to protect the sow from aggressions of other pigs, especially during feeding, and to enable the grower to have better access to the sows and regulate the amount of feed allocated and received by each sow. These previous practices are still followed in many farrowing operations. Individual stalls, however, substantially restrict a sow's movements, are uncomfortable, and eliminate any social contact with other sows, which is generally thought to be unhealthy. In recent years, therefore, the practice of group housing of gestating sows, mostly in static groups or without mixing the groups with other groups, and using large group feeding systems, has gained attention. Group housing gives each sow more total living space and more control over its immediate environment, and thus adds both comfort and accessibility for the sow. However, access to individual sows by the grower is severely limited.

As is stated in U.S. Pat. No. 5,309,864 to Harmsen et al. issued in 1994 and cited above, a prior method of farrowing was to isolate gestating sows either in a so-called farrowing pen or tied up where they stay until piglets are born and grow big enough to fend for themselves, at which time the sows are taken away and again closely penned or restricted. Such method according to Harmsen et al. had an adverse effect on the well being of the animals which could lead to adverse "farm-economic" results as being tied up causes "stress, abnormal behavior and diseases of the legs."

A variant of such method as noted above is the use of feeding cubicles where the sows are not tied up, but rather are permanently locked up in the small space of a feeding cubical. This system is subject to the same detriments. A further method known at the time as Harmsen described it, however, was keeping the animals in so-called group housing where the animals can move about in the spaces where they are housed. In such arrangement by making each animal electronically identifiable they could be automatically fed in feeding stations. Upon entering a feeding stall in such arrangement, a pig is electronically identified by means of an electronic identification label which it carries about its neck or which is attached to its ear, which identification label is read by a transmitter/receiver whereupon the information from the identity tag is transmitted to a computer which reports the amount of food to be allotted to the particular animal and operates one or more jackscrew motors which cause feed to be dropped into the feeding trough in front of the snout of the pig. Such arrangement, it is said, considerably increases the wellbeing of the animals and enables automation of feeding, although pecking order fights still tend to occur at feeding stations where several animals may wish to use the same station at the same time. Later inventors refined the system of Harmsen by providing automatic scales by which a sow might be weighed before exposed to food and the amount of food was then adjusted at or before being directed to a feeding station and the amount of food adjusted in accordance with such weighing. See, for example U.S. Pat. No. 6,539,896 to J. K. Larson which discloses the use of a carousel for feeding sows in a small space after weighing. Larsen also discloses that the transponder identification means can be used not only for individual automatic feeding of sows, but also for separation of the sows for insemination, i.e. usually artificial insemination, or for farrowing etc.

The use of an RFID transponder control or similar identification system for feeding considerably complicates farrowing operations and the present inventor has unexpectedly discovered that a simpler and less costly farrowing management system can be created by judicious combination of an RFID tag identification system plus a trickle feed system using an identification and sorting gate arrangement referred to as an "interrogator" to identify a sow from her RFID identifying tag with a pattern of regular passage of the sow through the open pen farrowing enclosure. Such regular passage is encouraged by placing the equipment for watering the sows and the trickle feeding equipment for feeding the sows on opposite sides of the interrogator apparatus to establish a regular circulation of the sows through such interrogation. With such arrangement, a regular circulation of sows is encouraged through the interrogator, which is provided with an entrance gate which remains closed until a sow within moves out of one of at least two exit gates. One of such gates leads to either a so-called loafing area where water is available or to the feeding area. In some cases having the gate oriented toward available water is preferable, as the sows will become thirsty fairly frequently and therefore pass through the gate more frequently.

On the other hand, the feeding area is larger and will also serve as a waiting area where the sows will wait for the trickle feeder to be activated frequently dozing or interacting amiably with the other sows in the meantime. However, depending somewhat upon the food mix the sows may have less need to drink than to eat. Alternatively, the interrogator will be oriented toward the loafing area where water is available as most of the animals will become thirsty and desire a drink more frequently than they will normally be fed, plus jamming up at the interrogator gate will not occur when periodic operation of the trickle feed system occurs. In other words, it is preferable to have a majority of the sows on the eating side of the interrogator gate when the trickle feeders begin operating so the sows do not jam up trying to get through the interrogator apparatus.

A serious consideration with large pen growing environments is the type of feeding system utilized. The system must provide adequate feed for the size of the group, should minimize the amount of fighting or competition for feed that occurs, and should provide the grower with a means of quantifying the amount of feed allocated per animal, which, as indicated above, is one advantage of housing sows in individual stalls. Mass feeding systems such as Electronic Feeding Stations (EFS's) that can be arranged to provide pre-measured rations to animals are now known and in use. Trickle Feeding systems, or systems where the feed is released slowly in individual feeding bins over the course of the feeding period, rather than all at once, are as noted above also known, such as the system manufactured by Automated Production Systems of Assumption, Ill. An advantage of Trickle Feeding systems is that they reduce the amount of fighting over food and vulva biting that occurs in a group environment by maintaining the attention of the more dominant animals during the feeding period as they wait for more food to trickle down. The ability and incentive for more dominant and aggressive animals to eat quickly and then push a slower eating animal out of its stall is thus reduced, while the more timid animals can thus eat at their own pace, although the success of such systems may depend on the size of the group. Since the same amount of food slowly trickles from each feeder, there is no incentive for a larger or more aggressive sow to try to use a different trickle feeder pushing another or driving another less aggressive sow out of the way. To do so would, in fact, merely take time out of eating possibly leaving the interloper with less rather than more feed. However, even with the use of trickle feeding, there is still a need for a simple and relatively inexpensive system to give grower's sow-level access to individual sows in a large pen gestation facility.

Rapid and proper treatment of sick and injured animals in a large pen environment is also critical to their welfare. While sows housed in individual gestation stalls may be protected from other sows and treated relatively quickly and easily, in a large pen environment it is difficult to capture and remove an injured or sick sow. However, even moderately sick or injured sows can be identified and removed from the group quickly and easily in the present inventors' system by directing the injured animal into a separate pen or holding area when attempting to pass from a separate loafing area where water is available back into the regular feeding area, so that the animal can be diagnosed and treated. Thus, the present system allows growers to better monitor the health of individual sows in the large pen, which will minimize health and disease problems that might otherwise quickly become unmanageable. The system of the invention also allows sows to be easily removed from the growing and management facility to actual farrowing or birth facilities where the sow may give birth to her piglets and thereafter be directed to a nursing facility until weaning.

While there have been a number of prior inventions for sow farrowing and the like, there has been a need for an efficient and practical system and method for handling breeding sows in the period just prior to and during the 100 to 110 days leading up to actual birth of piglets when the mother's health is of supreme importance to the effective production of healthy piglets. The present inventors have now by the judicious combination of particularly radio frequency technology for monitoring and sorting sows along with so-called Trickle Feeding or other similar slow metered feeding during this general gestation period together with apparatus for separating the sows into groups provided such an effective and practical system.

Radio frequency tag identification (RFID) technology makes use of so-called radio frequency tags which are integrally equipped with an antenna system that can both receive and transmit radio signals upon demand within the limits of detection. A unique identification or other signal along with in some cases a modicum of additional information may be passed back and forth between the RFID tag and a prompting and receiving system which both activates the RFID tag and receives and records its response. The response then is used to activate further apparatus for identification of the response or the taking of some other action. There are both passive and active RFID tags, the passive type using the interrogation signal to power its own response upon activation and the active type carrying its own small battery to power the radio signal response which will invariably, as long as the battery power lasts (which may be a multiple month period dependent upon usage) have a longer detection range than a passive system.

Trickle Feeding systems have been known for a few years. In such feeding a feeding apparatus slowly releases a stream of food pellets or the like at a rate significantly below the ability of an animal to eat the food released. A number of trickle feeders are operated at one time equal in most cases to the number of animals that may wish to feed at any given time so each animal may have its own stream of food and has no reason to try to appropriate the food stream of another animal, because no additional food will be available and, in fact, less food will be available to such animal if it tries to appropriate another's food stream because of the time taken away from actual eating trying to push another animal out of the way.

By the use then of a Trickle Feeding system occupying the majority of a sow gestating facility where the sows can occupy themselves with feeding plus a separate loafing area where the sows can get water from appropriate sprays or the like and a one way gate or series of gates between the two, a progressive flow of sows is established through a regular path one leg of which passes through an appropriate interrogator where individual RFID tags on separate sows are read and, if appropriate, the sow is directed through one or more controlled exits into special areas, one of which may be a so-called light feeding area in which sows with a decreased weight will be provided with a special high nutritious diet. Sick compartments may also be provided or a general removal arrangement used to conduct sows to some other facility such as a birthing room or the like. The RFID tags will normally be changed by operators with an appropriate RF wand apparatus by which sows can be marked or their RFID changed. Alternatively, and more usually, the operators may merely use a detector wand to detect the identification of a particular animal and enter such identification into the computer control of the system so that upon detection of such identification in the interrogator the sow will be directed to the proper next stage. If no special instructions for the particular sow are recorded, such sow will be merely returned to the main trickle or slow feeding area of the facility.

Flow

With respect to sow gestation facilities, flow is defined as the general pattern of travel of sows throughout the facility that is created by the design and placement of the barriers and objects the sows must interact with in the facility. The word "must" in this definition refers to the fact that such barriers and objects encompass not only physical barriers and objects, but also requirements for life such as food, water, oxygen, and warmth. These non-physical barriers and objects, or needs, are important to flow in the present invention of an automatic gestation facility system, since in the present system, both physical barriers or objects such as gates and fencing as well as non-physical barriers or requirements for life such as food and water are used to create flow.

Physical Barriers

In the design of the present inventor's automatic large pen gestation facility system and method, the living area or space available for the sows is divided into two separate principle areas, which areas are a feeding area and a loafing area. Approximately between 70%-90% of the living area will be dedicated to feeding, where the sows have access to food but only limited access to water, if any, while 10%-30% of the living area will be dedicated to loafing, where the sows have access to water but only limited access to food, if any, which feeding and loafing areas are separated by fencing, gates, or other flow controlling equipment. In the preferred embodiment, approximately 80% of the total space of the living area is dedicated to the feeding area, while approximately 20% is dedicated to the loafing area. As a result of such approximately 80/20 division of the living area, at any one time, approximately 80% of the sows will be in the feeding area, and 20% will be in the loafing area. Sows living in the feeding area can quickly gain access to the loafing area via apparatuses that allow only one-way passage from the feeding area to the loafing area, while sows living in the loafing area can quickly move to the feeding area only by passing through a flow controlling interrogator device. With approximately 80% of the sows living in the feeding area, the equipment controlling flow back to the feeding area from the loafing area does not create a bottleneck because at any one time only 20% of the sows must traverse such equipment in the immediate future. In addition, most sows that traverse the equipment from the loafing area to the feeding area will have already eaten, causing them to be more comfortable while entering the equipment and being processed.

Food and Water

Division of the living area into separate feeding and loafing areas creates a continual and natural flow of the sows from food to water and then from water to food. Sows that are feeding will eventually require water, which natural thirst will cause them to enter the loafing area through the one-way gates connecting such areas. Once in the loafing area, a sow has the choice to stay there until the next feeding, or to traverse the interrogating equipment and move back into the feeding area. However, because the loafing area comprises only approximately 20% of the total living area, the majority of sows will naturally tend to cross back into the less-crowded, more spacious feeding area. Separating the living area into separate feeding and loafing areas thus creates a natural flow or movement of the sows, which funnels them through the equipment. The present system takes advantage of such created flow upon the transition of the sows between such areas, at which point flow can be altered or tasks can be accomplished by the equipment. Alternatively, as noted above the one way interrogator may be arranged for flow or passage from the feed area to the loafing area taking advantage of the fact that when the animals are eating dry food their thirst will frequently cause them to seek to obtain a drink particularly after they have eaten their fill.

Capabilities

The equipment includes an interrogator device through which every sow must pass one-by-one in order to gain access to the feeding area from the loafing area or vice versa. Each sow is given a unique id or identifier, preferably using an RFID tag system. The equipment includes an interface which allows a grower to organize sows into functional groups based on their unique ids. Alternate flow and sow-level operations can then be performed using these groups when necessary. For example, a grower might wish to locate one or more individual sows in the population, feed a group of one or more sows differently than the rest of the population, grant a group of one or more sows access to the feeding area, set aside a group of one or more sows for special attention, mark a group of one or more sows in one or more ways for special attention, detect sows that did not eat or drink for a prolonged period of time, or detect when a sow has lost her id tag. As explained in further detail below, all of such tasks can be performed using the present inventor's automatic gestation facility system.

Referring now to the various figures there is shown in FIG. 1 for purposes of orientation a floor plan of a typical small pig production facility including an initial farrowing facility in accordance with this invention where the pork animals, so to speak, originate and a conventional finishing operation where the pork animals are fattened and grown to marketable size prior to being sent or shipped to market. FIG. 1 provides a valuable indication of how an entire pork operation will be typically constituted or arranged and the relationship of the parts. It should be understood that FIG. 1 illustrates a fairly small overall hog growing operation, but that the units are typically sized so that the design of a larger facility can be accomplished merely by multiplication of the basic units.

Starting in the top left hand corner of FIG. 1 there are two open pen gestating units A and B placed side by side. In such units a series of partial stalls or partially separated trickle feeding stations are lined up in rows 11 and 13, see FIG. 2.

Figure 3:
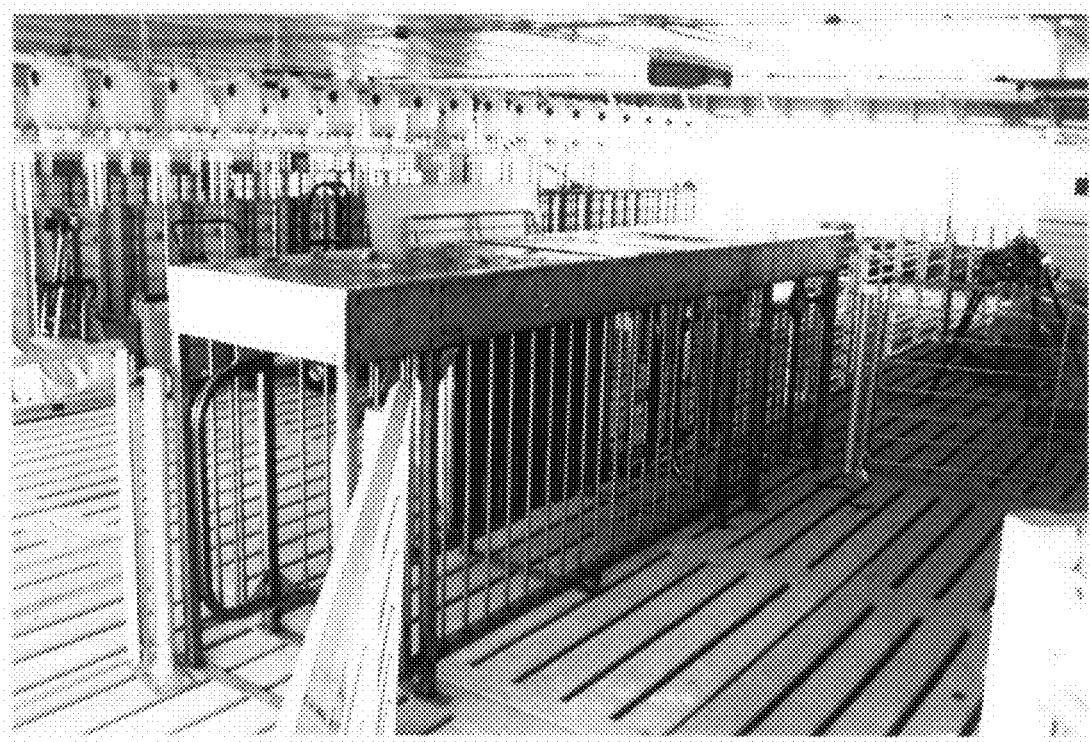
FIG. 3 is a view of a sow interrogator device in accordance with the teachings of the present invention.
Figure 4:
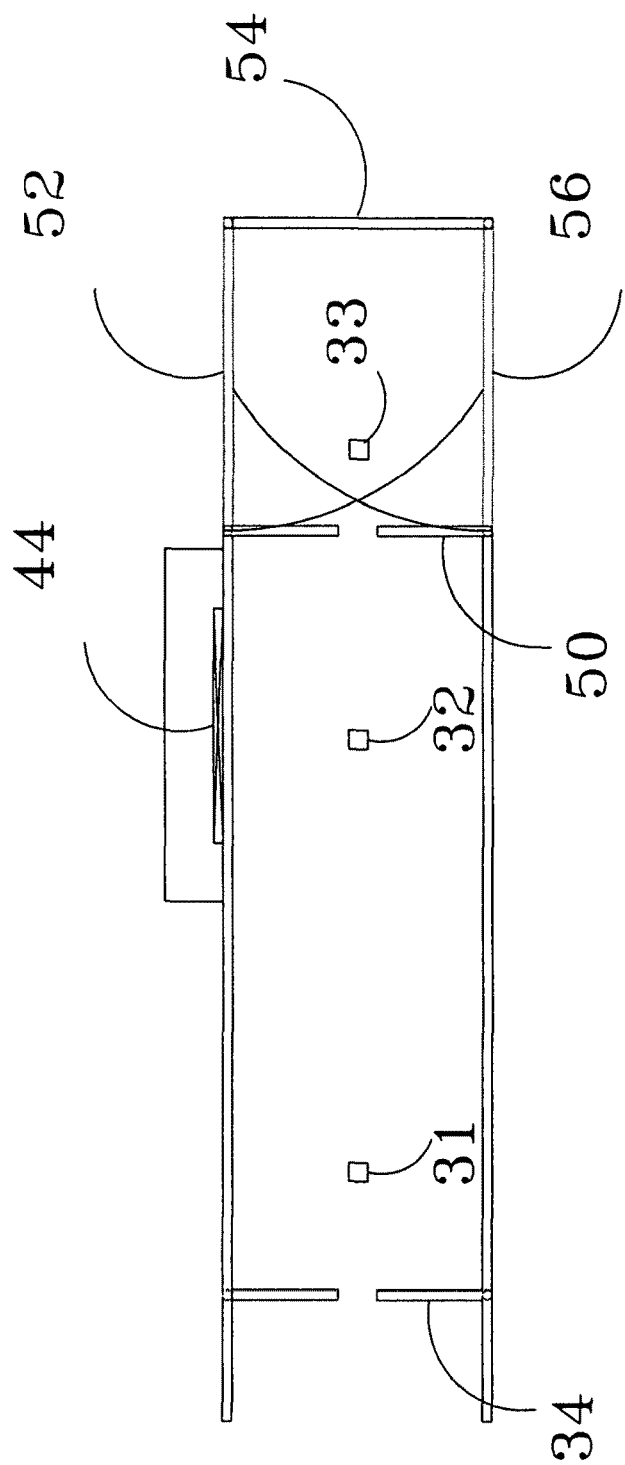
FIG. 4 is a top plan view of the sow interagator device of the invention.

Starting in the top left portion of FIG. 1 there are two open or large pen gestating facilities A and B with a series of trickle feeding stations shown as a series of 20 stations on each side for one group and 22 stations on each side for the other plus one interrogator positioned in each unit. An interrogator 30, see FIGS. 3 and 4, is shown adjacent an access way or alley 61 for each open pen unit. A series of pens "C" are for temporary retention of new sows for introduction to the open pens as other sows are removed to go to birthing or to go to impregnation in individual pens "D" where the sows may be stimulated with an actual boar led behind them and then when they go into heat artificially inseminating them. The sows in impregnating or breeding Section "D" may be maintained in this section for a period up to 28 or less days when their embryos may be assumed to be securely attached to their mother's womb or may be immediately transferred to the open pens A or B, although poking of their belly by other sows runs the risk of causing loss of one or more embryos. What procedure will be followed will depend frequently upon the number of impregnation pens available and the philosophy of the operator. An impregnated sow will remain in the open pen gestating facilities A and B until their recorded probable birthing date is near when they will be diverted by the second gate of the interrogator based upon records kept in the operating computer and associated software program and will be transferred via the hall or passage along the side of the building, usually by manual, driving to an individual pen in the birthing facilities or farrowing rooms E and F where the sows may stay until their piglets are born plus usually several weeks in addition after which the sows will be returned to the large pen gestating units A and B until time to be transferred to one of the group of breeding pens D. The small piglets will be in one of the pens in nursery rooms in Sections G, H and I in which the young pigs will be grown in communal conditions until large enough to be sent to finishing sections where they will be matured until ready for market when they will be transferred out to market through shipping chute P. The finishing section shown may be a conventional arrangement or may be in accordance with U.S. Pat. No. 6,526,919 issued Mar. 4, 2003 to one of the present inventors for a Hog Facility Management System and Method.

The following flow chart key provides reference identifications and general explanation of what is shown in FIG. 1.

Figure 2:
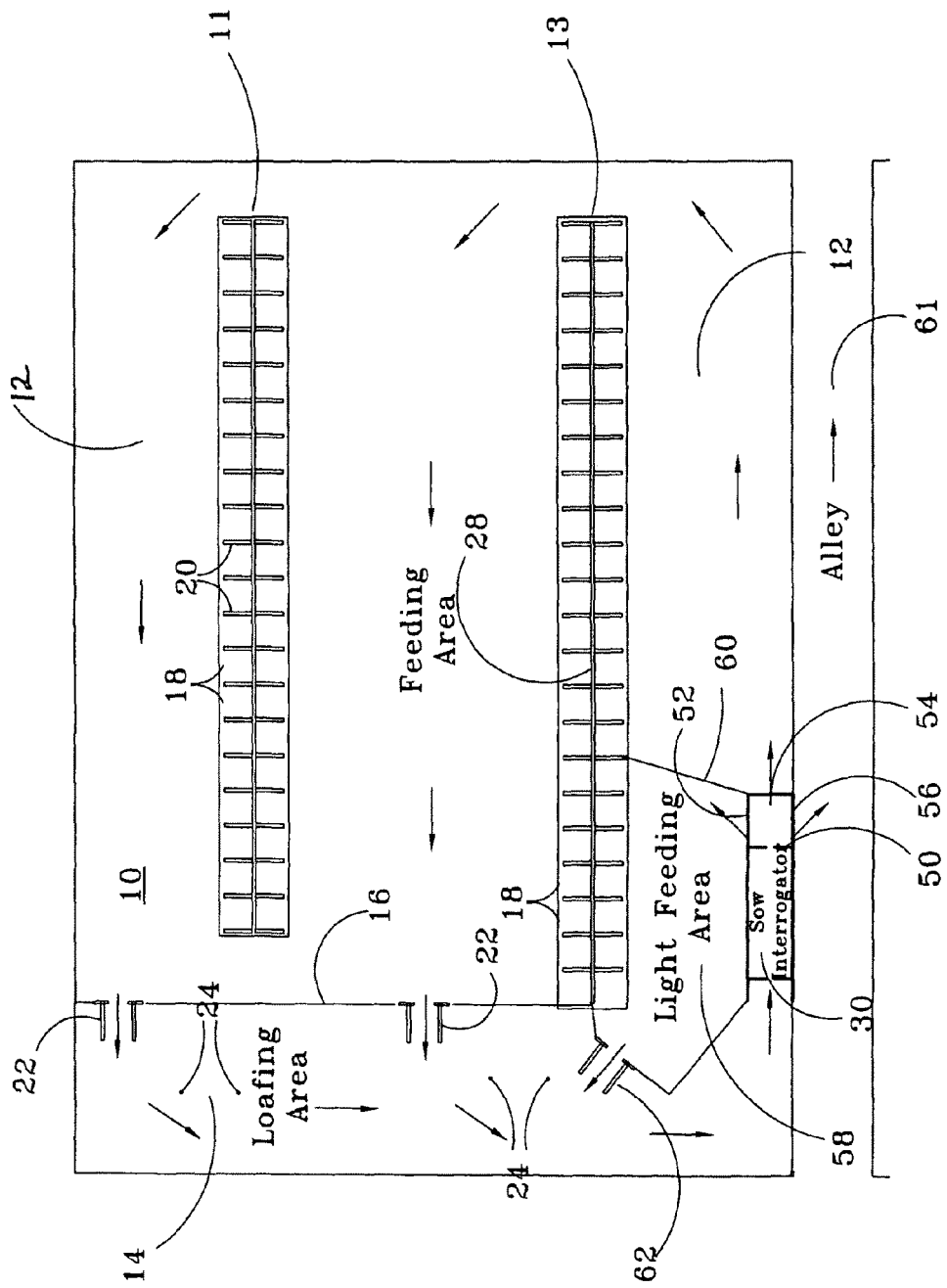
FIG. 2 is an enlarged plan view of the large pen sow gestation facility utilizing the system of the present invention including appurtenant facilities.

Flow Chart Key:
Pen A—Large pen gestation holding pen for 3½ groups of sows
Pen B—Large pen gestation holding pen for 3½ groups of sows
Pen C—Gilt grower (new animals for replacement)
Pen D—Gestation stalls for breeding
Pen E—Farrowing room #1
Pen F—Farrowing room #2
Pen G—Nursery room #1
Pen H—Nursery room #2
Pen I—Nursery room #3
Pen J—Grower/Finisher room #1
Pen K—Grower/Finisher room #2
Pen L—Grower/Finisher room #3
Pen M—Grower/Finisher room #4
Pen N—Grower/Finisher room #5
Pen O—Grower/Finisher room #6
Chute P—Load out to market From the forgoing it will be readily recognized that in a farrowing operation the management of the farrowing operation and particularly the gestating section is very important not only because the supply of pigs for finishing basically starts here and in the breeding section, but because it is of the supreme importance that the piglets ultimately coming from such section be both numerous and healthy. It has been found rather conclusively, furthermore, that a large or open pen gestating facility provides the healthy sows and piglets necessary to a modern successful farrowing operation. The advanced yet simplified gestating management system provided by the present invention supplies the necessary ingredients to be both economical and relatively fool proof to operate but also provides consistently healthy piglets with less loss than normal. With this in mind there is shown in FIG. 2 an enlarged diagram of the living area 10 of a sow gestation facility incorporating the features and improvements of the present invention. Living area 10 is divided into two main sections, labeled feeding area 12 and loafing area 14, which areas are separated by fencing or barrier 16. Feeding area 12 and loafing area 14 are sized such that feeding area 12 is approximately 4-5 times larger than loafing area 14.

A plurality of feeding stations 18 are situated in feeding area 12, which feeding stations are preferably part of an automated feeding system (AFS), which system is most preferably a Trickle Feeding system of a type known in the prior art, such as one distributed by Automated Production Systems, Inc., of Assumption, Ill., although other mass feeding systems such as a drop feeding system may also be used with the invention. An advantage of Trickle Feeding systems is that they limit aggression and feed intake by dominant sows, since the feeding trough area is divided into individual feeding stations by shoulder-length or other partial or shield-type barriers 20 spaced apart approximately 19 to 24 inches. In a typical arrangement, an auger apparatus may slowly deliver 0.2 to 0.4 lb. of food/minute over a period of approximately 15 to 30 minutes. There is no incentive for sows to leave a feeder or feeding station to get to another station and to bully other sows, since the slow feed distribution encourages the sows to remain at the initial feeding station for the duration of the feeding period.

One-way gates 22 situated along fencing 16 allow sows in living area 10 to move quickly and directly from feeding area 12 to loafing area 14, where a plurality of readily accessible waterers 24 are available. Sows can linger in loafing area 14 as long as they please; however, since feeding area 12 is much larger than loafing area 14, and when loafing area 14 becomes crowded, sows that have had their thirst satiated will tend to leave loafing area 14 in favor of the more spacious feeding area 12, where they will await the next scheduled feeding. Since food is usually available only in feeding area 12, and water is usually accessible only in loafing area 14, a natural flow of sows between such areas as they become alternatively hungry or thirsty will develop. In addition, as discussed in greater detail below, in order for the sows to move from loafing area 14 back into feeding area 12, they must pass one at a time through interrogator apparatus 30, at which time numerous different identification, sorting, marking or other management activities that give the grower a previously unavailable level of management control over the group or groups of sows in living area 10 may be undertaken.

Apparatus 30, shown in further detail in FIG. 2 and outlined in FIG. 3, is essentially a one-way identification device sows must navigate through in order to move from loafing area 14 to feeding area 12. In a preferred embodiment, upon being placed in living area 10 and prior to entering apparatus 30, each sow will be equipped with an electronic identification device such as a Radio Frequency Identification an (RFID) tag 42 (not shown), which devices are now well known to those skilled in the prior art as containing a transponder with a digital memory chip having a unique code. When a sow enters the apparatus 30, as shown in FIG. 4 and explained below, photoeye detectors 31-33 are used to detect the presence of the sow, and to control the front and rear gates as required. Then, an RFID tag reader 44, attached to the side of the interrogator outside the bars thereof, which tag reader is usually comprised of an antenna package with a transceiver and a decoder, connected to apparatus 30, will emit a signal that activates RFID tag 42 so it can be read. Data could also be written to an RFID tag 42, on the animal within although this is generally not necessary in the present embodiment. When an RFID tag 42 passes through the electromagnetic zone of reader 44, the reader's activation signal is detected. RFID reader 44 will then decode the data encoded in the RFID tag 42, which data is passed to a host computer where it can be processed using application software. While RFID tags, of course, may hold different types of information, the main use of such tags in the present system is for purposes of individual sow identification.

Once the sow in apparatus 30 has been identified, depending upon the sow's identity and the required tasks scheduled or associated with the RFID tag 42, the sow may be directed to exit device 30 through one of three gates 52, 54 and 56 in front of head gate 50, as shown in FIG. 1. Note in FIG. 2 that a small area 58 is separated from the rest of feeding area 12 by fence 60 extending between the exit end of apparatus 30 and a row of feeding stations 18. As shown in FIG. 4, first photoeye detector 31, second photoeye detector 32 and third photoeye detector 33 are located near the rear, middle and front end of apparatus 30, respectively. Second photoeye 32 is polled to detect a sow, and when tripped second photoeye 32 causes the tail gate 34 to be closed, at which time RFID tag 42 on the sow is read. The directional gates 52, 54, and 56 are moved to direct the sow appropriately upon exiting apparatus 30, and then head gate 50 is opened to allow the sow to exit such apparatus. Photoeye detector 33 will then detect the sow passing out one the directional gates 52, 54, 56, and once the sow has cleared the apparatus and is no longer detected by photoeye detector 33, the tail gate 34 will open, head gate 50 will close, and the device will be ready for the next sow.

Sows, as shown in FIG. 2, that have been visually identified by the grower as being "light" may be directed to exit apparatus 30 through gate 52 into area 58 where they may be fed a different diet from that being fed to the other sows in regular feeding area 12, which diet may include either extra feed or feed having different nutritional features. As a practical matter, the Trickle Feeding apparatus 28 such as, for example, shown in a photograph illustration in FIG. 14, which is continued into light feeding area may be merely turned up to dispense more food in such area and the numbers of operational feeding apparatus' will be adjusted to match the number of sows in such area. Alternatively, individual or groups of sows may be directed into area 58 for other reasons, depending upon the circumstances, such as to receive vaccinations or pregnancy testing, although normally only "light" sows will be directed into such area. A one-way gate 62 leading from "light" feed area 58 back to loafing area 14 is provided, so that the basic flow from feed to water and then water to feed continues. A sow in apparatus 30 after being identified by RFID decoder 44 may alternatively be directed to exit through gate 54, which gate leads directly back to regular feeding area 12, where such sow can continue with regular living/growing conditions. In addition, as a third alternative, a sow in apparatus 30 may be directed to exit through gate 56 which may lead to an alleyway 61 or other holding area. For example, sows to be culled from living area 10 either because they are ready to farrow, are no longer pregnant, are sick or injured, or for those that may otherwise need special attention, may be directed through gate 56.

Figure 6:
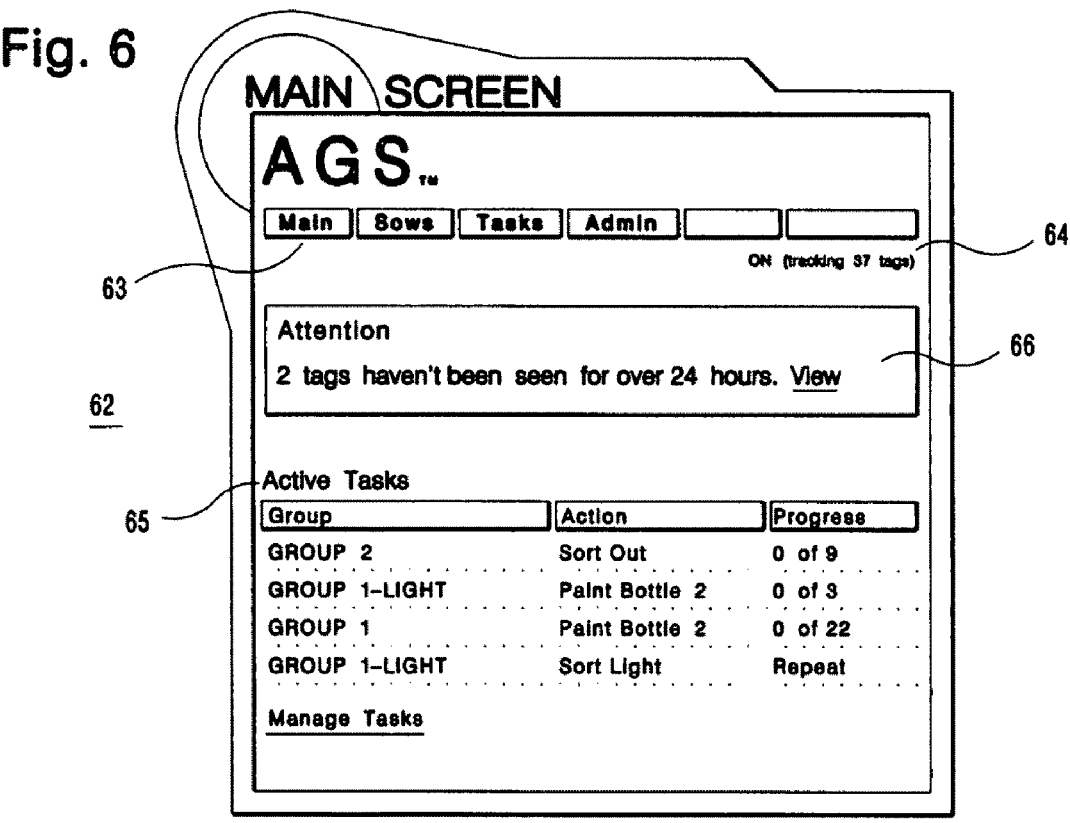
FIG. 6 illustrates a sample main screen for the application software program used with the present invention

As indicated above, application software is utilized in combination with the electronic sow identification system, which is preferably an RFID tag or similar system, in order to process and utilize data received from the tag. Preferably, the system utilizes a browser based or web-style interface served or delivered by or from an embedded web server in the interrogator apparatus 30. As a result, the server in apparatus 30 can be accessed or controlled from any location where a network connection to the server can be established. Following are several examples wherein, to name a few operations, groups of sows are identified, tasks are scheduled, and administrative tasks are attended to. FIG. 6 illustrates a Main Screen 62 for such an application program, which screen includes a menu bar 63, a count 64 of the number of tags currently being tracked by the system, the number of active tasks 65 that have currently been scheduled to be carried out or completed, as well as the current status of each of such tasks, and any special system notices or warnings 66, the main one being for tags that have not been read by tag reader 42 recently, which could indicate either a lost tag or a sick or injured sow.

Figure 7:
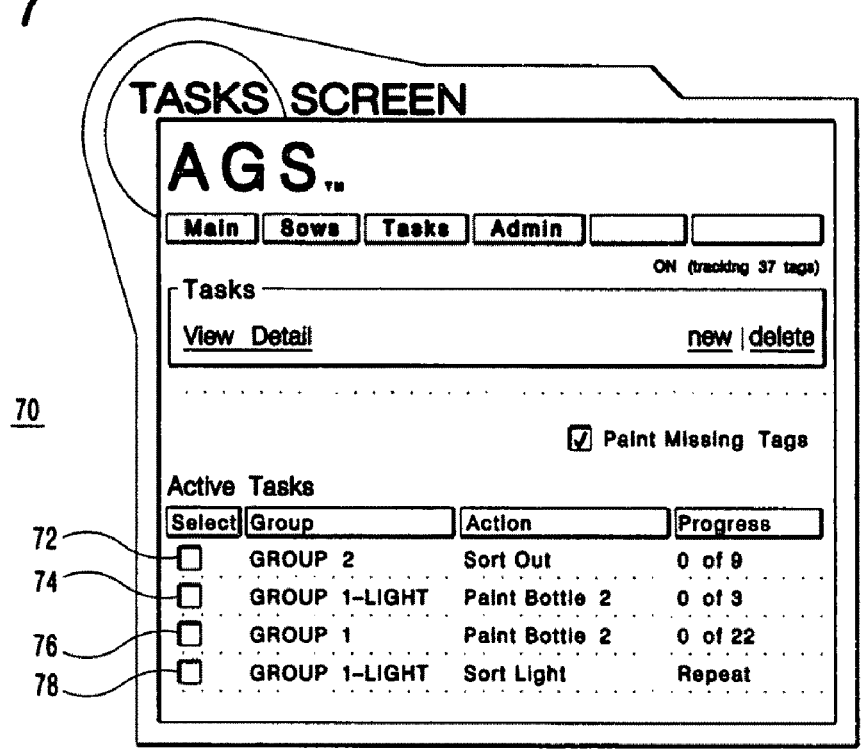
FIG. 7 illustrates a sample "tasks" screen for the application software program used with the present invention.

FIG. 7 is a screen shot of a sample Tasks Screen 70 wherein various tasks with respect to certain groups of sows that have been scheduled to be performed are listed, as well as the current status of the action. For example, in task 72, sows in Group 2 are scheduled to be sorted out, and currently 0 of 9 sows in the group have been sorted. In tasks 74 and 76, sows in Group 1—Light and Group I are scheduled to be marked with paint using paint bottle 2, such as to identify sows requiring vaccinations or the like, and intask 78 sows in Group I—Light are to be sorted into the light feeding area where they will have access to different food from the other sows, and which task is to be repeated.

FIG. 8 is a Screen Shot 80 of a screen listing RFID tags 82 that have not been detected by the RFID reader in apparatus 30 in the last 24 hours. If an RFID tag has not been read within a reasonable time period, this could mean that a sow has not had access to water in the last 24 hours, or to feed in the last 24 hours, and therefore may be sick or injured and need attention, at which point the grower can physically look for the sow, and the sow can be identified using a portable RFID tag reader. Alternatively, a tag 82 that has not been read for 24 hours could also mean that the tag has fallen off the sow. The grower can then either look for a sow without a tag, or, if a sow without a tag has passed through the apparatus 30, the grower can first look to a missing tag notice 66 notice on Main Screen 62. Sows with missing or otherwise unreadable tags can be automatically painted for quick identification using the tasks screen.

FIG. 9 is a sample screen shot of a New Group Screen 90, from which the grower can create a new group or groups 92 of sows. New groups 92 most logically will be created by grouping sows together that will be scheduled to have the same tasks performed. The new group 92 is given a Name 94. Once a new group 92 has been created, the New Tasks Screen 96, a sample screen shot of which is shown in FIG. 10, may be used to create a new task or Action 98 for each new group 94, or to schedule a new task for an already existing group. A drop-down menu 99 of typical tasks is provided for convenience.

Figure 11:
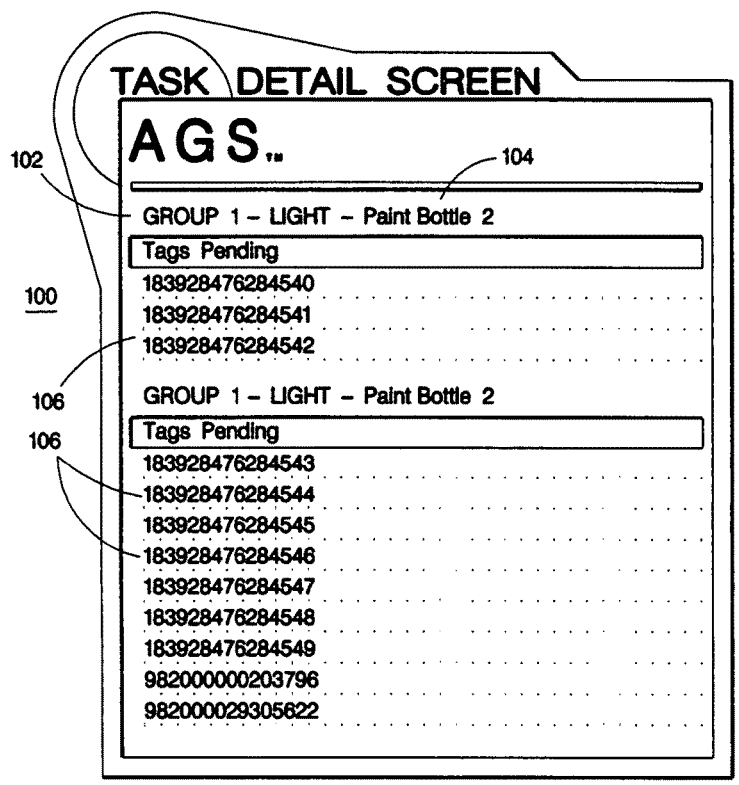
FIG. 11 illustrates a sample "task detail" screen showing undetected RFID tags for the application software program used with the present invention.
Figure 12:
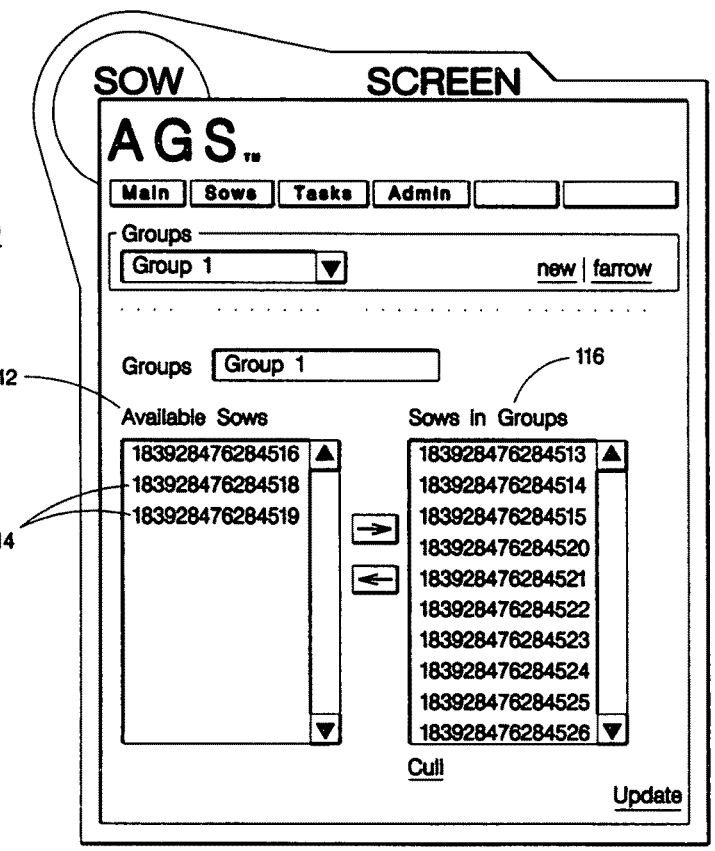
FIG. 12 illustrates a sample "sow screen" for the application software program used with the present invention.

FIG. 11 is a sample screen shot of a Task Detail Screen 100, on which screen the Group 102 and Tasks 104 to be performed are listed, as well as the RFID tag numbers 106 for the sows in such groups that have not had the designated task performed on them yet. Thus, for example, if 9 out of 10 sows in a group have had a task completed, the grower can find the RFID tag number of the sow on which the task has not yet been completed, and then attempt to locate such sow in living area 10 using a portable RFID tag reader. FIG. 12 is a sample screen shot of Sow Screen 110 on which screen the entire population of sows in the living area 10 can be managed and tracked. When a new sow or sows enter the living area and they pass through apparatus 30, the software will identify these sows as not belonging to a group and list them as being available 112, with their RFID tag numbers 114. These sows can then either be added to an existing group, added to a new group, or both, depending upon the type of task that has to be performed on these sows, simply by clicking on the RFID number with the mouse and the transferring the number to the Sows in Group area list 116. For example, if the new sows 112 need vaccinations, and there is already a group of sows scheduled to receive vaccinations, the new sows can be added to this group and may be painted or sorted as they pass through apparatus 30 as desired. If one or more sows that are Available appear to be light, they can be made to exit into the Light Feed Area wherein the sows are receiving a special feed. A "farrow" option is also available, as shown in the drop down menu 99 on the Tasks screen 96 shown in FIG. 10, which if chosen sows in this group will be moved through gate 56 and removed from the population of living area 10, and the RFID tag numbers for these sows will be removed from the population list automatically. Similarly, sows to be culled are removed from the population in a similar manner. In other words, the farrow and cull options simply removes the group along with the sows from the system.

Figure 13:
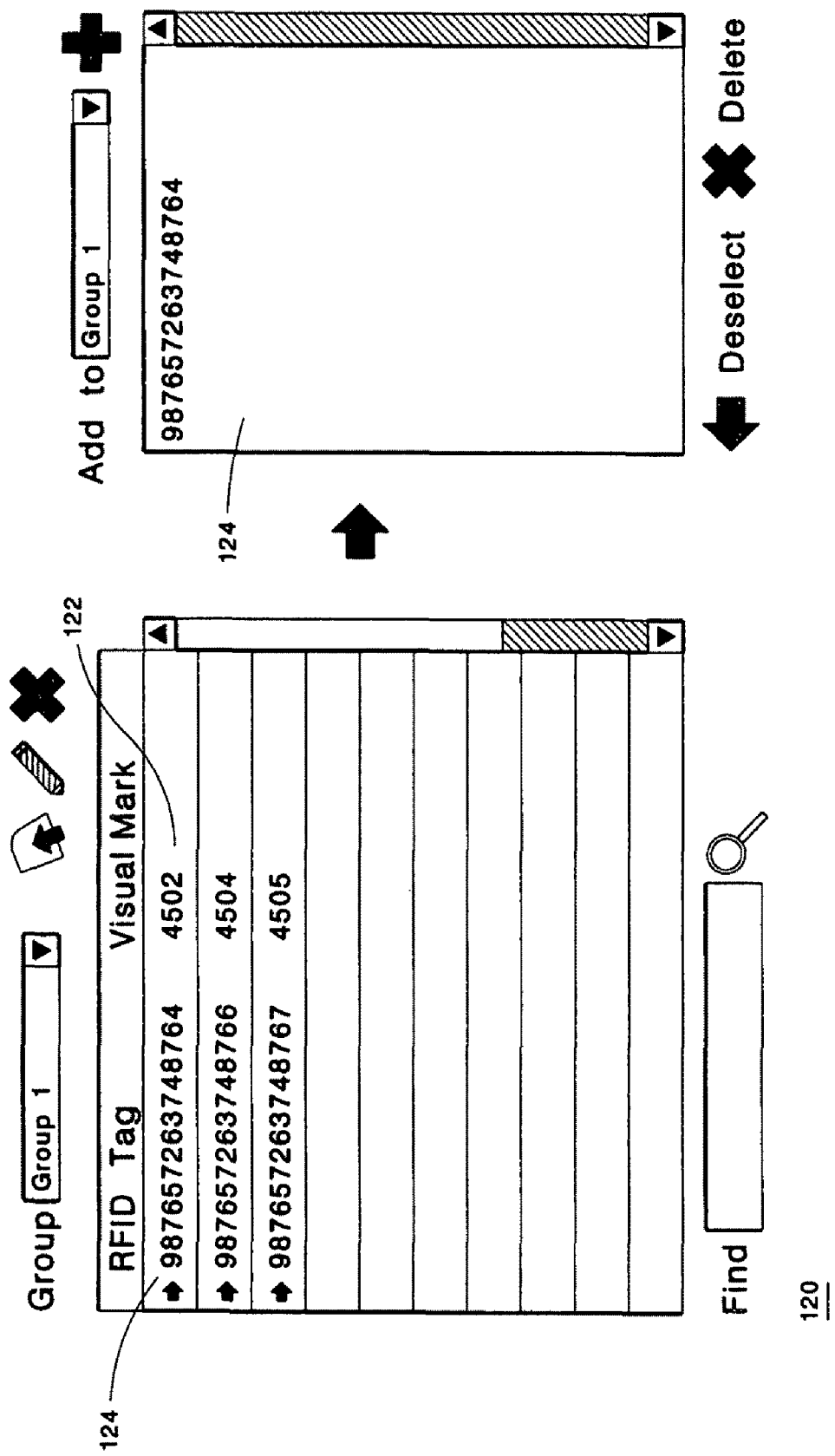
FIG. 13 illustrates an alternative "Grouping" screen and arrangement for use with the present invention.

While an individual interrogator may be controlled adequately using the above system, in most large sow operations there will likely be multiple numbers of pens for accommodating gestating sows, in some very large farms up to 5,000 sows. In such cases, the number of interrogator devices will also increase more or less in unison with the number of pens. The present inventor has thus found that it is very useful from a ease of management perspective to be able to control data from multiple interrogator devices using a single user interface, rather than having separate interfaces for each interrogator. Thus, a single hard drive, card, or the like that is electronically linked to each of the interrogator devices and to a single software program and user interface may be provided. As a result, tracking and managing movements of sows over time as they may be moved from one pen to another depending on the availability of space for a group and the like becomes much easier. In addition, as shown in FIG. 13, which is a sample screen shot of a centralized type grouping screen 120, each sow is provided with a universal four digit number 122, which number may be permanently placed on a sow such as by painting, branding, or tattooing or other means of visually marking and is also used to keep track of the sows. In scanning a long list of numbers, it is easier to visually search for and pick out a particular four-digit number as compared to picking out a fifteen digit number as shown from a list. In addition, the four-digit number is used to identify the sow regardless of the RFIG tag number 124, which number may change if a tag is ripped off or lost from the sow and must be replaced with a different number. Sows would still be placed in groups 124 as in the previous examples.

Figure 14:
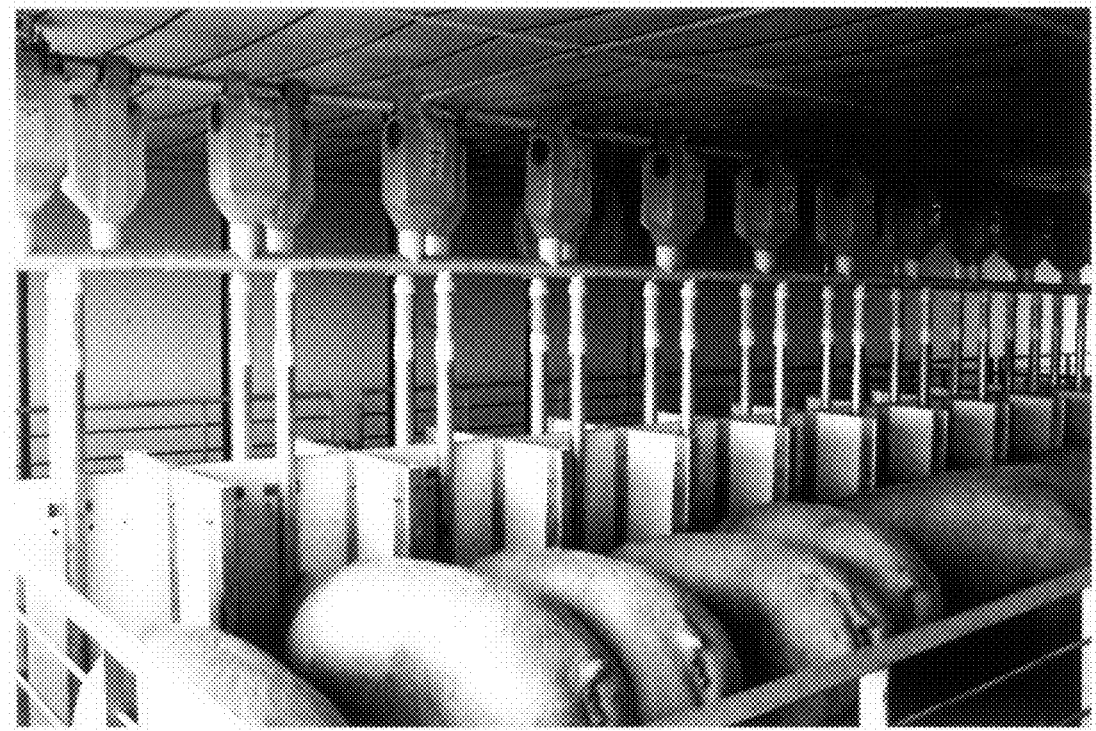
FIG. 14 illustrates a typical construction and use of a Trickle feed apparatus.

FIG. 14 shows in a photographic reproduction a typical Trickle Feed operation with sows making use of it in the foreground. In such installation a top auger feed pipe passes above near the ceiling and is connected to a plurality of feed reservoirs directly below and spaced on opposite sides of such auger reservoirs. Such reservoirs have a feed scale on the surface which indicates how much feed material is set to flow from the reservoir during any given time period. A second auger pipe is connected to the outlet of each reservoir and a feed pipe leads down into individual feed stations or partial stalls arranged as shown in FIG. 2. The top auger in feed pipe may operate more or less continuously until the reservoirs are essentially filled. When each reservoir is filled feed will stop being fed into such reservoir and will be directed to the next reservoir down line until all reservoirs are filled at which point it may be arranged for the top auger to cease operation. When feeding time then comes the lower auger will be operated and will transport feed as it drops from the reservoirs into the closest down stream discharge pipe or feed pipe into a feed station where it may be deposited into a feed trough, not shown, or simply onto a concrete or other feed surface where the sows can have easy access to it. The system is simple and relatively foolproof and since each feed scale indicator will be set to the same point so that each reservoir 63 will empty out to the same degree and all sows 69 will be provided with food at a slow pace, slower than they normally will or can eat, with the same amount of feed, they will tend to wait for more rather than trying to grab a neighboring sow's food which such neighbor will have already eaten anyway. In this way aggression between the sows is almost completely eliminated, considerably calming the whole operation. These feeders are not computerized except for an on/off signal and if the computer operation should happen to go down, or fail, the system can be manually switched on so the sows are not deprived of their feed. On the other hand, if the computer system controlling the interrogator apparatus should fail, the only operation interrupted will be the scheduled tasks related to the sorting the sows, which can usually be interrupted without damage unless some fearful illness strikes or the stoppage lasts more than several days and sows need to be removed to the birthing rooms, in which case such operations can be carried out manually.

Figure 5:
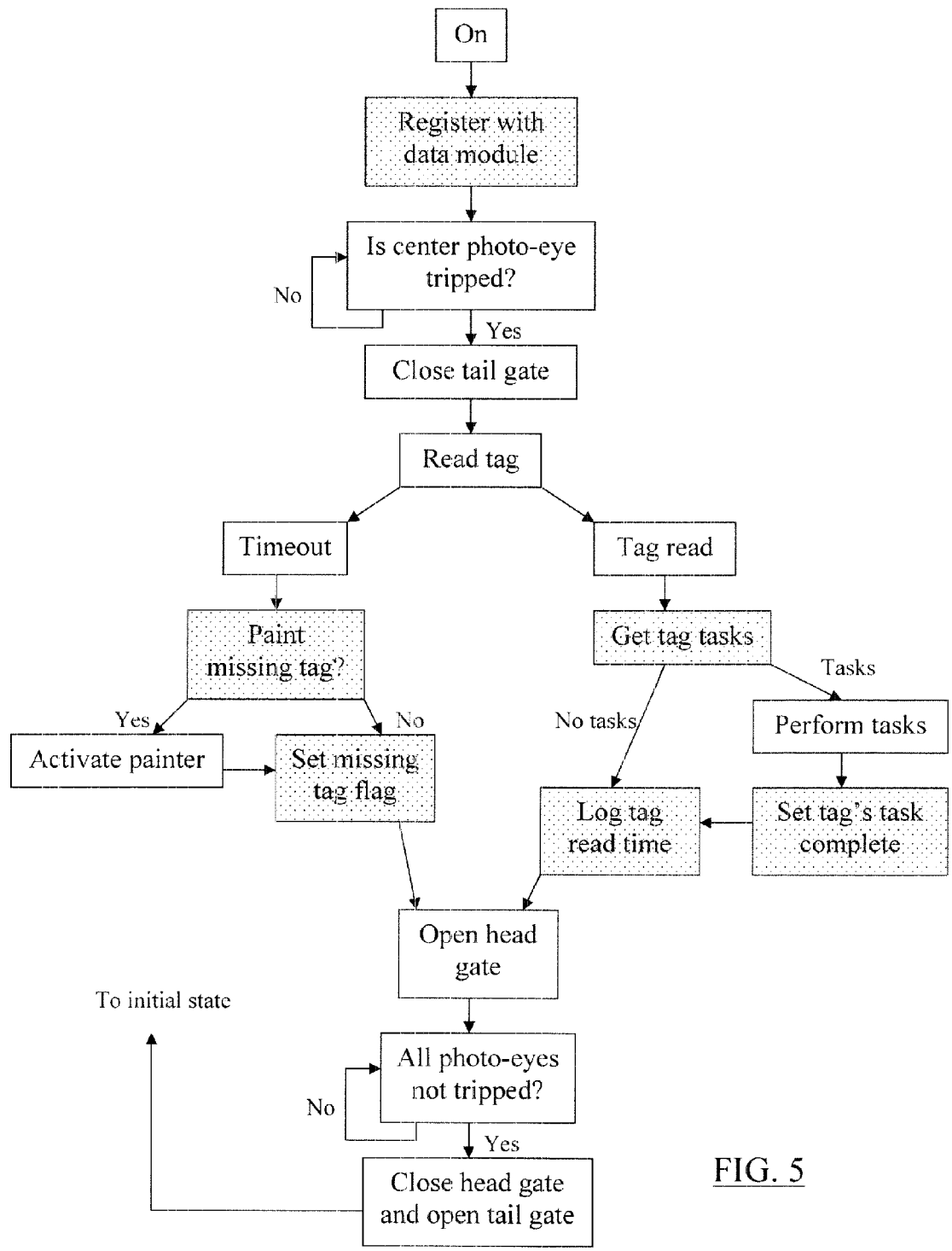
FIG. 5 is a flow chart of the general operational logic of an interrogator apparatus of the invention.

As will be evident from the above the present applicant's system is both relatively simple and foolproof as well as more economical than where electronically operated feed systems are used to feed sows in individual feeding pens or stalls, and less interrogators are necessary than where electronic feeding stalls are necessary in other systems. Reference to the control diagram in FIG. 5 illustrates the various functions and operations that can be readily performed with the interrogator apparatus of the invention and the sequence of such performance.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention.

We claim:

1. A system for managing sows in a farrowing operation in which said operation is separated into at least separate impregnation, gestation and birthing operation areas comprising:
  (a) an impregnation section having plural impregnation means in the form of individual pens for sows to be artificially impregnated by boar semen,
  (b) an open pen gestation section having sufficient square footage to accommodate at least 20 sows with not less than about 24 square feet of free space for each sow to be housed in the gestation area,
  (c) said gestation section being separated into a feeding area and a loafing, or time-out area separated from each other by a sow barrier,
  (d) the sow barrier being breached by an electronic interrogator through which sows must pass in order to traverse the barrier in a first direction, said interrogator being adapted to interact with an identification means uniquely associated with each sow to identify and initiate a record of the presence in the interrogator at a given time of such a particular sow, and by at least one one-way gate through which the sows must pass in order to breach the barrier in a second direction,
  (e) the feeding area being provided with a series of trickle feeding stations equal to the maximum number of sows for which the open pen arrangement is designed, and having no access to water stations,
  (f) the loafing area being provided with sow watering means and having no access to feeding stations,
  (g) a further restricted area sow retaining section to which a sow may be directed upon passing through said interrogator,
  (h) the interrogator being positioned such that passage from one of the feeding areas and loafing areas must at all times be through said interrogator, the interrogator being provided with an entrance gate adapted to open into a main interrogator section where recognition and recording of the sow's identity is conducted, and (j) at least two alternative exit gates through which sows may be routed upon exiting said interrogator depending upon a predetermined electronic instruction derived from in the interrogator gate electronic operating means.

2. A system for managing sows in a farrowing operation in accordance with claim 1 wherein the interrogator is designed to read radio frequency identification tags.

3. A system for managing sows in a farrowing operation in accordance with claim 2 wherein the interrogator is provided with an interrogator section where a sow's radio frequency tag means is read and the result is automatically compared with data held in the electronic data system to operate a gate section at one end of the interrogator section containing alternate gates to one of the feeding and loafing areas and an exit gate to the further restriction area with control means to determine to which of such areas a sow will be admitted upon passing through the interrogator.

4. A system for managing sows in a farrowing operation in accordance with claim 3 wherein passage through the interrogator is from the feeding area to the loafing and watering area of the open pen gestating section.

5. A system for managing sows in a farrowing operation in accordance with claim 3 wherein passage through the interrogator is from the loafing area to the feeding area.

6. A system for managing sows in a farrowing operation in accordance with claim 3 wherein the interrogator is provided with alternative exit gates leading alternatively into the feeding area or loafing area or the alternative section together with appropriate control means.

7. A system for managing sows in a farrowing operation in accordance with claim 3 in which a two gate arrangement is used at the exit from the interrogator in one of said two alternative exits leads into either the feeding area or the loafing area, and the other of said exits leads into a special food feed section comprising said further restricted area.

8. A system for managing sows in a farrowing operation in accordance with claim 7 wherein the entrance gate section provided at each end of the interrogator leading to the interrogator section along with two sets of exit gates one of such gates in each set arranged to lead into one of the feeding area and loafing area and the other leading to a special retention section.

9. A system for managing sows in a farrowing operation in accordance with claim 1 wherein the interrogator is designed to read radio frequency identification (RFID) tags attached to individual sows.

10. A system for managing sows in a farrowing operation in accordance with claim 9 wherein the interrogator includes an interrogation section where a sow's radio frequency tag means is read and the result is automatically compared with data held in the electronic data system to operate a gate section at one end of the interrogator section containing alternate gates to one of the feeding and loafing areas and an exit gate to the further restriction area with control means to determine to which of such areas a sow will be admitted upon passing through the interrogator.

11. A system for managing sows in a farrowing operation in accordance with claim 10 in which a two gate arrangement is used at the exit from the interrogator in one of said two alternative exits leads into either the feeding area the loafing area, and the other of said exits leads into a special food feed section comprising said further restricted area.

12. A system for managing sows in a farrowing operation in accordance with claim 10 wherein the entrance gate section provided at each end of the interrogator leading to the interrogator section along with two sets of exit gates one of such gates in each set arranged to lead into one of the feeding area and loafing area and the other leading to a special retention section.

13. A system for managing sows in a farrowing operation in which said operation is separated into at least separate impregnation, gestation and birthing operation areas, said gestation area comprising:

(a) an open pen separated into a feeding area and a loafing area by a sow barrier, said feeding area comprising between about 70% to 90% of the pen space, (b) the sow barrier being breached by an electronic interrogator apparatus through which sows must pass in order to traverse the barrier in a first direction, said interrogator being adapted to interact with an identification means uniquely associated with each sow to identify and initiate a record of the presence in the interrogator at a given time of a particular sow, and by at least one one-way gate through which the sows must pass in order to breach the barrier in a second direction, (c) the feeding area being provided with a slow feeding system having a number of stations equal to the maximum number of sows for which the open pen arrangement is designed, but no water stations, (d) the loafing area being provided with sow watering means but no feeding stations, (e) a further restricted area sow retaining section to which a sow may be directed upon passing through said interrogator, (f) the interrogator being positioned such that passage from one of the feeding areas and loafing areas must at all times be through said interrogator, (g) the interrogator being provided with an entrance gate adapted to open into a main interrogator section where recognition and recording of the sow's identity is conducted, and (h) at least two alternative exit gates through which sows may be routed upon exiting said interrogator depending upon a predetermined electronic instruction derived from in the interrogator gate electronic operating means.

14. A system for managing sows in a farrowing operation in accordance with claim 13 wherein passage through the interrogator is from the feeding area to the loafing and watering area of the open pen gestating section.

15. A system for managing sows in a farrowing operation in accordance with claim 13 wherein passage through the interrogator is from the loafing area to the feeding area.

16. A system for managing sows in a farrowing operation in accordance with claim 13 wherein the interrogator is provided with alternative exit gates leading alternatively into the feeding area or loafing area or the alternative section together with appropriate control means.

17. The system for managing sows in a farrowing operation in accordance with claim 13 additionally comprising application software for processing and receiving data from said electronic interrogator to allow for individual sow level management of the sows in said living area.

18. The system of managing sows in a farrowing operation of claim 17 additionally comprising a web server embedded in the electronic interrogator which communicates with the application software via a network connection and browser based interface.

19. The system for managing sows in a farrowing operation of claim 17 in which said application software is used to create and identify groups of sows, schedule tasks to be performed on individual sows or groups of sows, add and delete sows to be included in a group, and track which tasks have been completed with respect to individual sows or each member of a group of sows.

20. The system for managing sows in a farrowing operation of claim 19 in which said application software is used to keep track of any sows that have not been detected by the electronic sow identification system within a prescribed time period, or that have passed into the interrogator apparatus without being individually identified.

21. The system for managing sows in a farrowing operation of claim 20 in which new sows added to the living area are automatically identified by the electronic interrogator upon passing into said interrogator, and can be added to an existing group or groups for which tasks have already been scheduled.

22. The system for managing sows in a farrowing operation in accordance with claim 21 in which the software application includes "pregnancy testing" and "farrow" options whereby sows identified for pregnancy testing are diverted to said holding area and sows identified for farrowing are diverted out of said pen to a farrowing room.

23. The system for managing sows in a farrowing operation in accordance with claim 22 in which the software application is used to manage and control multiple interrogator devices in different pens in a large farm operation using a single user interface, and whereby each sow is provided with a unique universal code which is permanently placed on the sow to aid in tracking sows moved between different pens and upon being accorded different RFID tag numbers.

24. The system for managing sows in a farrowing operation in accordance with claim 20 in which sows that have not been detected within said prescribed time period or that cannot be individual identified by the interrogator apparatus are marked by painting upon entering the interrogator apparatus.

* * * * *